United States Patent [19]

Imaizumi et al.

[11] E Re. 31,317

[45] Reissued Jul. 19, 1983

[54] RARE EARTH-COBALT SYSTEM PERMANENT MAGNETIC ALLOYS AND METHOD OF PREPARING SAME

[75] Inventors: Nobuo Imaizumi; Kazuo Wakana, both of Tokyo, Japan

[73] Assignee: Namiki Precision Jewel Co., Ltd., Tokyo, Japan

[21] Appl. No.: 209,664

[22] Filed: Nov. 24, 1980

Related U.S. Patent Documents

Reissue of:

[64] Patent No.: 4,221,613
Issued: Sep. 9, 1980
Appl. No.: 6,,024
Filed: Jan. 24, 1979

[30] Foreign Application Priority Data

Feb. 3, 1978 [JP] Japan ..... 53-015518

[51] Int. Cl.[3] ..... H01F 1/02

[52] U.S. Cl. ..... 148/103; 148/31.57; 148/101; 420/435

[58] Field of Search ..... 75/134 C, 134 F, 170, 75/227; 148/31.57, 101, 103, 104, 105, 108, 126

[56] References Cited

U.S. PATENT DOCUMENTS

| | | | |
|---|---|---|---|
| 2,810,640 | 10/1957 | Bolkcom et al. | 75/134 M |
| 3,560,200 | 2/1971 | Nesbitt et al. | 75/123 E |
| 3,695,945 | 10/1972 | Benz | 148/101 |
| 4,082,582 | 4/1978 | Menth et al. | 75/152 |
| 4,172,717 | 10/1979 | Tokunaga et al. | 148/31.57 |

*Primary Examiner*—John P. Sheehan
*Attorney, Agent, or Firm*—Gerald J. Ferguson, Jr.; Joseph J. Baker

[57] ABSTRACT

Permanent magnetic alloys comprising 11.5–12.5% rare earth components of which 6.3–12% is samarium and 0.5–6.2% is yttrium; 0.2–2.5% hafnium, [19.5–26.5%] *10.5–26.5%* iron, 7–10.5% copper, and 52–70.7% cobalt, the ranges of the components being in atomic ratios. The alloys are prepared by obtaining 1–50 μm. powders of the components, compacting the powder after mangetic field orientation sintering the compacted powders at 1160°–1220° for 1–10 hours, cooling the sintered body at a rate of at least 1° C./second until the temperature is about 900° C., and then annealing the body at 750°–900° C.

7 Claims, 3 Drawing Figures

RARE EARTH-COBALT SYSTEM PERMANENT MAGNETIC ALLOYS AND METHOD OF PREPARING SAME

Matter enclosed in heavy brackets [ ] appears in the original patent but forms no part of this reissue specification; matter printed in italics indicates the additions made by reissue.

BACKGROUND OF THE INVENTION

This invention relates to permanent magnetic alloys and, in particular, to rare earth-cobalt system permanent magnetic alloys.

Among the intermediate substances of $RCo_5$ and $R_2Co_{17}$ intermetallic compounds, those which are composed of R(CoFeCu)z (z=5–85) where the Co or Co and Fe components have been partially substituted with Cu are known to be excellent material for permanent magnets, see, for example, U.S. Pat. No. 3,560,200. In recent years, rather than the high coercive force ($_1$Hc) of rare earth-cobalt magnets, high residual magnetic flux density (Br) is in demand from applied fields. Thus, the main stream of rare earth magnets is shifting from the $_1$Hc-dominant 1–5 system sintered magnets to Br-dominant 2–17 system magnets.

It is disclosed in Japanese Patent Application 52-154207, which is incorporated herein by reference, that alloys of (Sm, Y) (Co, Fe, Cu)z composition in which the R component consists of Sm and Y result in a permanent magnet with a high Br value of approximately 11KG while maintaining the coercive force of above 3KOe. However, in the case of rare earth magnets, due to the low value (3–6KOe) of coercive force, their application is limited by the fact that the maximum efficiency is obtained when used on the side of relatively high permeance coefficient (B/H=2–5) with respect to the magnet circuit.

SUMMARY OF THE INVENTION

It is thus a primary object of this invention to provide $_1$HC upgrading lowering the Br of the magnetic alloy.

Accordingly, it is an object of this invention to provide for the addition of a trace amount of hafnium (Hf) to the permanent magnetic alloys described in the above-mentioned Japanese application so that the permanent magnetic alloys of this invention are characterized by the fact that the main components are $R_2T_{17}$ intermetallic compounds composed of rare earth metals (R=Sm, Y) and 3d transition metals (T=Co, Fe, Cu), to which a trace amount of Hf element is added.

It is a further object to provide an improved method for making the above permanent magnet alloys.

Other objects and advantages of this invention will be apparent from a reading of the following specification and claims taken with the drawing.

DETAILED DESCRIPTION OF PREFERRED EMBODIMENTS

Figure 2:
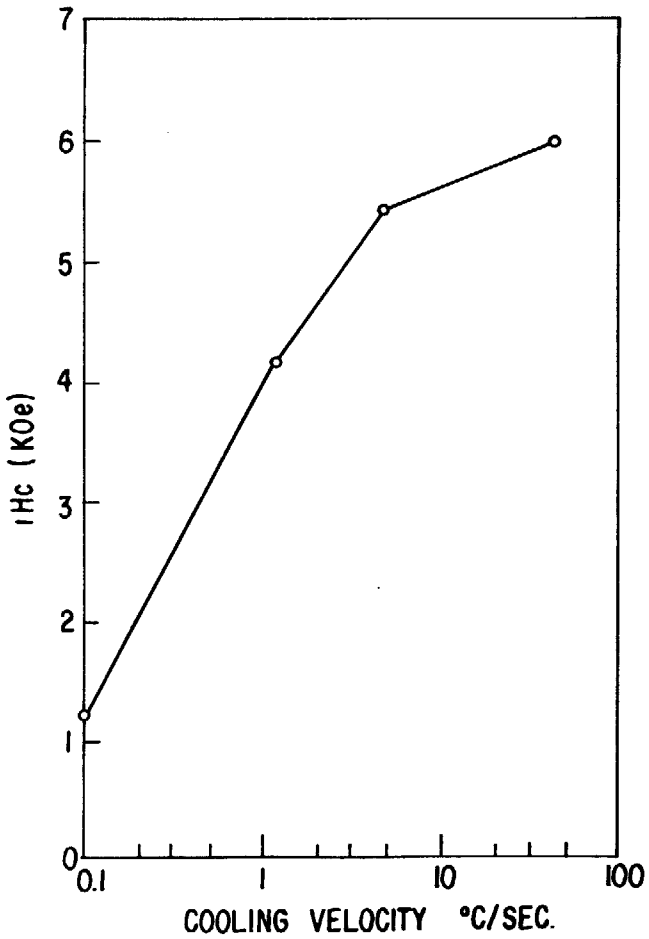
FIG. 2 shows the dependency of $_1$Hc on cooling velocity.

The permanent magnetic alloy of this invention is generally manufactured in the following sequence after weighing the raw material: melting, pulverizing, magnetic field orientation, compressive forming, sintering, and annealing. The melting and the pulverizing processes may also be carried out by the direct reduction method of oxides to manufacture the powder. In cooling to room temperature after sintering, quenching to 900° C. or lower from the sintering temperature was found effective. Melting is effective when it is carried out in an inert atmosphere with a high frequency induction furnace, electric arc furnace, etc. Pulverizing into fine powder should be done in an inert atmosphere or organic solution. There is no great difference in the performance of various pulverizers. The grain size of the powder is not as sensitive as in the case of 1–5 system magnets, and fairly constant values of coercive force are maintained in the range of 1–50 μm. However, considering the aspect of grain orientation level, the grain size of 1–5 μm is desirable. The sintering process is carried out most effectively in an inert atmosphere or in vacuum at the temperature range of 1160°–1220° C., and the sintering time of 1–10 hours is favorable in the industrial sense. The range of sintering and sintering temperature depends on the permissible composition range of the magnetic alloys of this invention and the grain size of the powder. The rapid cooling treatment after sintering is one of the processes required to obtain the desired magnetic characteristics of this invention. The cooling velocity should be at least 1° C. per second until the sintering temperature is lowered to below 900° C. This process is believed to have a strong influence on the coercive force increment during the next process of annealing carried out at 750°–900° C.

The preferred ranges for components of the permanent magnetic alloys of this invention may be limited to 11.5–12.5% in atomic ratios for rare earth components (Sm and Y), 0.2–2.5% for Hf, 10.5–26.5% for Fe, 7–10.5% for Cu, and 52–70.8% for Co. The 11.5–12.5% rare earth components should be 0.5–6.2% Y and 6.3–12% Sm. These ranges are related to the magnetic characteristics. The coercive force increment action of the Hf component is apparently influenced more strongly by the mixed state of Sm and Y rather than Sm alone as the rare earth component. However, the coercive force increment is not marked at a Hf quantity of less than 0.2%. Further, at above 2.5% Hf, although a magnetic force of 7–8KOe is obtained, the saturation magnetization is lowered. Thus, the Hf range should be between 0.2–2.5% with a Sm and Y mixture. Regarding the rare earth components, when Y is below 0.5%, both Br and Hc decrease, and the $_1$Hc increase resulting from the Hf addition is also reduced. At above 6.2%, virtually no change occurs in the saturation magnetization compared to the case of Sm because of the increase in the magnetic alloy of the $Y_2(CoFe)_{17}$ compound with low anisotropism to begin with, but both Br and $_1$Hc are reduced. Thus, the range can be limited to 0.5–6.2%, and the remaining rare earth component is provided by 6.3–12% Sm. The Fe component contributes the most to increase the Br value of the alloy as a whole. At below 10.5%, although the coercive force increases by about 0.5–1 KOe, high Br value, which is an object of this invention, cannot be obtained and thus the Fe component should be at least 10.5%. At 26.5% or above, extreme deterioration of coercive force is caused. Thus, the effective range of the Fe should be limited to 10.5–26.5%. The Cu component becomes the generating element for the precipitating action during annealing and plays an important role in the mechanism to generate the coercive force. However, sufficient precipitating action cannot be obtained at below 7%. At above 10.5%, the Cu component being a nonmagnetic element, causes lowered saturation magnetization. Thus, the Cu range should be limited to 7–10.5%. The remainder is the Co component of 52–70.8%.

This invention is described in further detail using the practical, illustrative examples below.

EXAMPLE 1

Figure 1:
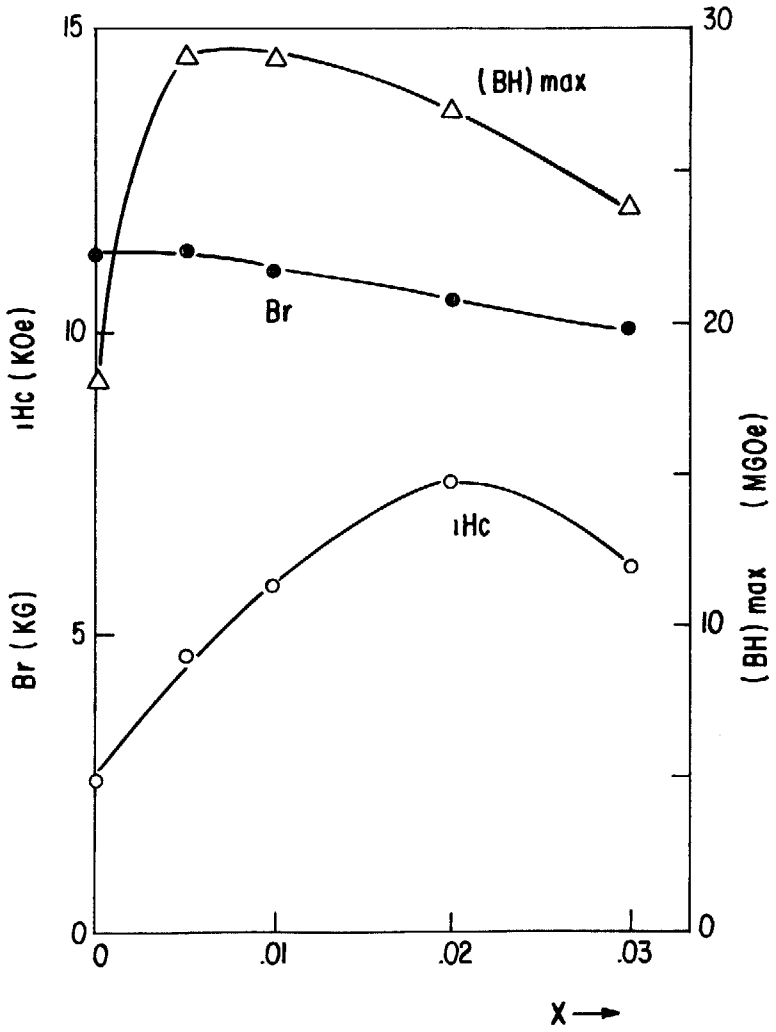
FIG. 1 shows the dependency of the magnetic characteristics on Hf quantity of an illustrative permanent magnetic alloy in accordance with the invention having a composition formula of $Sm_{0.9}Y_{0.1}(Hf_xCo_{0.72-x}Fe_{0.1-8}Cu_{0.10})_{7.2}$.

Five types of the alloy shown in Table 1 having the composition formula of $Sm_{0.9}Y_{0.1}(Hf_xCo_{0.72-x}Fe_{0.1-8}Cu_{0.10})_{7.2}$ and x as the parameter were melted with arc in Argon (Ar), and ingots were made with a water-cooling copper mold. Next, the ingots were pulverized in toluene to a grain diameter of approximately 3.5 μm with a vibration mill. After the grain orientation in a magnetic field of approximately 10 KOe, molding was done with isotropic compression of 5t/cm². The molded pieces were sintered at 1190° C. in vacuum of approximately $10^{-3}$ mmHg for one hour and cooled to room temperature at a velocity of approximately 10° C./sec. Next, the sintered metal was annealed at 850° C. for 30 min. in an Argon(Ar) atmosphere and gradually cooled to room temperature. The magnetic characteristics of this sample are shown in FIG. 1.

EXAMPLE 2

Three types of the alloy shown in Table 2 having the composition formula of $Sm_{1-y}Y_y(Co_{0.71}Fe_{0.1-8}Cu_{0.10}Hf_{0.01})_{7.2}$ and y as the parameter, were processed as in Example 1, in the sequence of melting, pulverizing, magnetic field orientation, compressive forming, sintering, and annealing, and the final alloy was obtained. The resulting magnetic characteristics are shown in Table 3. As is clear from Table 3, the additive effect of Hf on increasing the coercive force was more pronounced with the Y and Sm mixture rather than the Sm alone.

TABLE 1

| (Atomic Percent) | | | | | | |
|---|---|---|---|---|---|---|
| X | Hf | Co | Fe | Cu | Y | Sm |
| 0 | 0 | 63.2 | 15.8 | 8.9 | 1.2 | 11.0 |
| 0.005 | 0.4 | 62.8 | | | | |
| 0.01 | 0.9 | 62.3 | | | | |
| 0.02 | 1.8 | 61.4 | | | | |
| 0.03 | 2.6 | 60.6 | | | | |

TABLE 2

| (Atomic Percent) | | | | | | |
|---|---|---|---|---|---|---|
| y | Y | Sm | Hf | Co | Fe | Cu |
| 0 | 0 | 11.9 | 0.9 | 62.5 | 15.9 | 8.8 |
| 0.1 | 1.2 | 10.7 | | | | |
| 0.3 | 3.6 | 8.3 | | | | |

TABLE 3

| y | Br(KG) | ıHc(KOe) | (BH)maxMGOe |
|---|---|---|---|
| 0 | 10.7 | 2.6 | 17.0 |
| 0.1 | 11.0 | 4.5 | 27.2 |
| 0.3 | 11.0 | 4.0 | 24.5 |

EXAMPLE 3

An alloy composed of 10.9 At.% Sm, 1.2% Y, 66.1% Co, 12.3% Fe, 8.8% Cu, and 0.6% Hf was processed as in Example 1 to obtain ingots, which were then subjected to pulverizing, magnetic field orientation, and compressive forming to obtain molded pieces. The molded pieces were sintered at five temperature levels of 1220° C., 1210° C., 1200° C., 1190° C., 1180° C., and cooled to room temperature at the velocity of 40° C./sec after each sintering. Next, after reheating for 30 min. at 850° C. they were cooled in the furnace to room temperature, and the magnetic characteristics were determined. The results are shown in Table 4.

EXAMPLE 4

An alloy composed of 10.9% Sm, 1.2% Y, 62.6% Co, 15.8% Fe, 8.8% Cu, and 0.6% Hf was processed as in Example 3 to obtain compression-molded pieces. Some of the molded pieces were sintered at five different levels of temperature, 1210° C., 1200° C., 1190° C., 1180° C., and 1170° C., and then cooled and reheated as in Example 3. The magnetic characteristics were determined as in Example 3, and the results shown in Table 5 were obtained.

TABLE 4

| NO | Heat treatment conditions | | Br (KG) | ıHc (KOe) | (BH) max MGOe |
|---|---|---|---|---|---|
| 1 | 1220° C., 1h | +850° C. 30 min | 10.8 | 3.7 | 18.0 |
| 2 | 1210° C., 1h | | 10.8 | 5.6 | 26.8 |
| 3 | 1200° C., 1h | | 10.3 | 6.1 | 26.0 |
| 4 | 1190° C., 1h | | 10.2 | 6.2 | 26.0 |
| 5 | 1180° C., 5h | | 10.3 | 6.5 | 26.3 |

TABLE 5

| NO | Heat treatment conditions | | Br (KG) | ıHc (KOe) | (BH) max MGOe |
|---|---|---|---|---|---|
| 6 | 1210° C., 1h | +850° C., 30 min | 11.2 | 4.0 | 27.1 |
| 7 | 1200° C., 1h | | 11.4 | 4.8 | 29.5 |
| 8 | 1190° C., 1h | | 11.3 | 5.6 | 30.8 |
| 9 | 1180° C., 1h | | 10.7 | 6.1 | 27.8 |
| 10 | 1170° C., 1h | | 9.6 | 4.5 | 20.5 |

EXAMPLE 5

An alloy composed of 10.9% Sm, 1.2% Y, 59.1% Co, 19.3% Fe, 8.8% Cu, and 0.6% Hf was subjected to heat treatment as in Example 4 and the magnetic characteristics were determined, the results of which are shown in Table 6.

TABLE 6

| NO | Heat treatment conditions | | Br (KG) | ıHc (KOe) | (BH) max MGOe |
|---|---|---|---|---|---|
| 11 | 1210° C., 1h | +850° C., 30 min | 10.4 | 2.1 | 8.5 |
| 12 | 1200° C., 1h | | 11.1 | 3.6 | 17.5 |
| 13 | 1190° C., 1h | | 11.6 | 3.6 | 23.0 |
| 14 | 1180° C., 1h | | 11.6 | 4.0 | 28.0 |
| 15 | 1170° C., 1h | | 11.2 | 4.0 | 26.3 |

EXAMPLE 6

The compression-molded pieces made in Example 4 were sintered at 1190° C. for one hour, and the cooling velocity from the sintering temperature to room temperature was varied by methods such as furnace cooling, draw quenching, gas quenching, liquid quenching, and 5-step controlled quenching treatment. Each alloy piece was then annealed at 850° C. for 30 min., and cooled in furnace (approximately 4 hours from 850° C. to below 100° C.) to room temperature, and the magnetic characteristics were determined. The results that $_iHc$ is greatly influenced by the cooling velocity from the sintering temperature. In the composition ranges of permanent magnetic alloys based on this invention, a cooling velocity of at least 1° C./sec is preferred as shown in FIG. 2.

EXAMPLE 7

Figure 3:
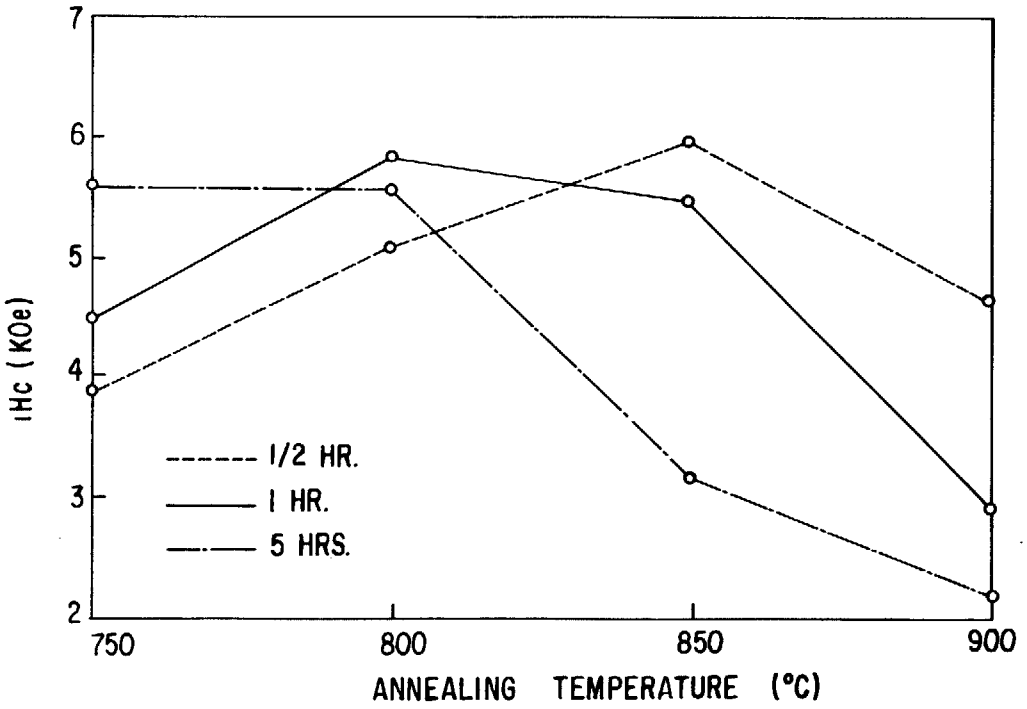
FIG. 3 shows the dependency of $_1$Hc on annealing temperature and annealing time.

The compression-molded alloy made in Example 4 was sintered at 1190° C. for one hour, and quench-treated to room temperature at the rate of approximately 40° C./sec. The samples were annealed in the temperature range of 700°-900° C. and the annealing time was varied from 30-min, 1 hr. and 5 hrs. to examine the changes in coercive force. The results obtained are shown in FIG. 3.

As explained above, the permanent magnetic alloys based on this invention are characterized by the fact that their chief components are $R_2T_{17}$ intermetallic compounds with Y and Sm as the rare earth components, to which a trace amount of Hf is added to compensate for or increase the coercive force which is lowered as the composition significantly changes (especially the increase in Fe component) to increase Br in the magnetic alloy. Consequently, the permanent magnetic alloys of this invention should be applicable not only to the rotary machinery but also in fields where low coefficient of permeance applies.

What is claimed is:

1. Permanent magnetic alloys comprising 11.5-12.5% rare earth components of which 6.3-12% is samarium and 0.5-6.2% in yttrium; 0.2-2.5% hafnium, [19.5-26.5%] *10.5-26.5%* iron, 7-10.5% copper, and 52-[70.7%] *70.8%* cobalt, the ranges of the aforesaid components being in atomic ratios.

2. A method of preparing the alloys of claim 1 comprising the steps of melting raw material containing said components, solidifying the resulting melt, pulverizing the resulting ingot into powders having a grain size of 1-50 μm, compacting the powders after magnetic field orientation thereof, sintering said compacted powders at 1160°-1220° C. for 1-10 hours, cooling the sintered body at a rate of at least 1° C./second at least until the temperature is about 900° C., and then annealing the resulting bulk at 750°-900° C.

3. The method as in claim 2 where said annealing occurs at about 850° C. for about ½ hour.

4. The method as in claim 2 where said melting is effected in an inert atmosphere with a high frequency induction furnace or an electric arc furnace.

5. The method as in claims 2 or 4 where said cooling is effected by quenching the sintered body.

6. The method as in claim 2 where said grain size of the powders is 1-5 μm.

7. The method as in claim 2 where the sintered body is cooled to room temperature.

* * * * *